Aug. 4, 1942.   P. S. MORGAN   2,292,007
LIQUID DISPENSING APPARATUS
Filed Jan. 22, 1941
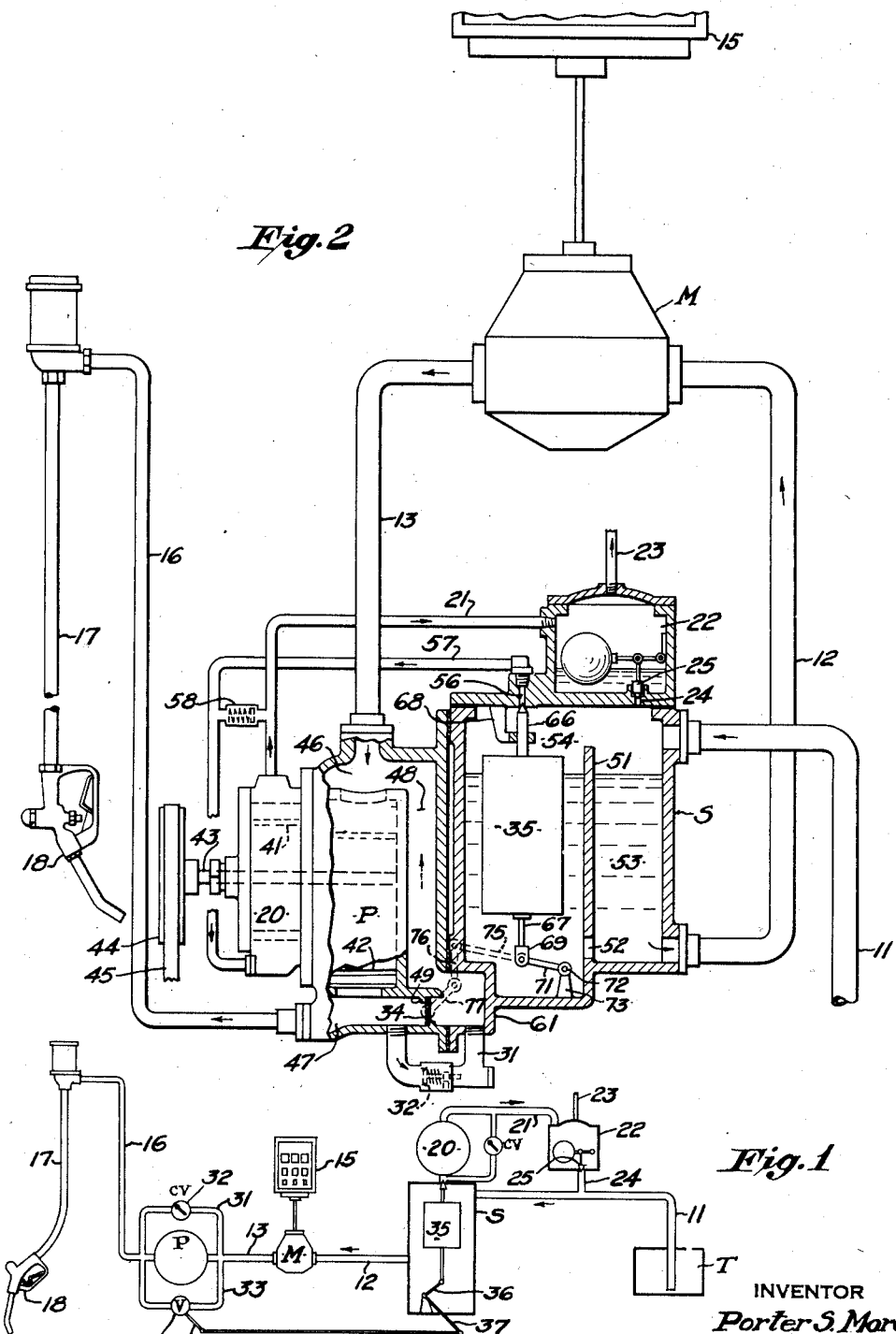
INVENTOR
*Porter S. Morgan*
BY
*Albert R. Henry*
ATTORNEY Patented Aug. 4, 1942

2,292,007

UNITED STATES PATENT OFFICE 2,292,007

LIQUID DISPENSING APPARATUS

Porter S. Morgan, Westport, Conn., assignor to The American Brake Shoe and Foundry Company, New York, N. Y., a corporation of Delaware Application January 22, 1941, Serial No. 375,409

9 Claims. (Cl. 221—95)

This invention relates to a liquid dispensing system particularly adapted for the dispensing of volatile liquids such as gasoline, and it has particular reference to a dispensing system wherein the liquid is measured under conditions insuring a minimum pressure drop through the measuring element, and to apparatus by means of which the system may be effectively utilized.

A system now commonly employed for the dispensing of gasoline comprises a pumping unit drawing liquid from a reservoir for discharge to a delivery point through an interposed air separator and liquid meter. The gasoline flowing from the pump is, of course, under a positive pressure head, and this head has created problems in the design and maintenance of two of the elements through which the liquid thereafter flows,—namely, the air separator and the meter. Basically, the function of the air separator is to eliminate air or other incondensible gases from the pump effluent, because if such gases were allowed to flow to the meter, accurate readings would not be possible. The meter, in turn, invariably contains some element movable under the force of the flowing liquid, and the movement is registered to determine the quantity of liquid actually dispensed.

The relatively high pressure head of the pump effluent composed of mixed gas and liquid is eventually reduced to atmospheric pressure, the gas volumes bleeding to the atmosphere through a suitable vent in the separator, and the liquid portion discharging to atmosphere through the delivery hose. These pressure drops occur within a relatively limited distance, and the stated problems arise from the circumstance that such pressure reductions tend (1) to eject gasoline from the vent of the separator, and (2) to force unregistered volumes of liquid through the meter element itself. While the art has heretofore been able to meet these problems after a fashion, it has not, insofar as I am aware, attacked the problem from the viewpoint of eliminating the stated cause of the pressure reductions between the discharge side of the pump and the atmospheric discharge points. The present invention proposes to do so.

To that end, the invention, in one aspect, contemplates a liquid dispensing system wherein the liquid meter, instead of receiving the pump discharge, is disposed in the suction line of the pump, and the liquid discharging from the pump flows directly to the delivery hose.

In another aspect, the invention provides for the disposition of an air separator on the suction side of the pump, and, as it will more fully appear hereinafter, such air separator may perform two functions. These are: first, the heretofore intended function of eliminating air from the liquid before the liquid enters the meter; and, second, the interruption of liquid flow under any condition which tends to overload the system with gas.

Treated in another manner, the invention moreover provides an improved air-eliminating liquid pump which operates, in an automatic fashion, to dispense or deliver air-free liquid volumes, and which pump may, therefore, be utilized in other systems than the one just outlined.

The principles of the invention, and the advantages to be obtained from the use thereof, will be made clear by a perusal of the following description, read in connection with the accompanying drawings, wherein:

Fig. 1 is a diagrammatic or schematic view, showing the components and arrangement of the elements in the novel system, and, Fig. 2 is a view, partially in section and partially in elevation, of a combined pumping unit and air separator, as it may be incorporated in the system.

The system illustrated in Fig. 1 comprises a supply tank T containing the gasoline or other liquid to be dispensed, an air separator S, a flow meter M, and a pump P, which are connected in series, with respect to the path of liquid flow, in the order stated. The tank is connected to the separator by a suction conduit 11, while a separator delivery conduit 12 and meter delivery conduit 13 serve to complete the connections between the tank and the suction side of the pump. Actuation of the meter M by the flowing liquid is reflected in a counter 15, suitably connected to the meter, and which therefore registers the number of gallons of liquid flowing through the circuit. The pump effluent is delivered through a conduit 16 and a hose 17 to a manually controlled dispensing nozzle 18.

It will be observed that both the separator and meter are located on the suction side of the pump, and, accordingly, neither of these elements is subjected to high pressure, nor is there the danger of leakage of the inflammable gasoline now encountered in the customary systems.

The air or other incondensible gas, eliminated in the separator S, is advantageously withdrawn by means of an auxiliary pump 20 whose discharge line 21 is connected to a condensing chamber 22. This chamber is provided with a vent line 23 permitting the gases to escape to the atmosphere, and with a drain 24, governed by a float-controlled valve 25, which is connected to the suction line 11, or other suitable discharge point. When the liquid entering the condensing chamber 22 accumulates sufficiently to raise the float, such liquid returns to the system, and the drain 24 is thereupon again closed.

The air-free liquid flowing from the separator must, of course, go through the meter M, and thereafter it flows to the pump P, either for delivery to the nozzle 18, or for movement through by-passing circuits, if the conditions so require.

The pump P, which may here be regarded as a usual positive displacement type, is provided with the customary over-load by-passing circuit 31, bridging the discharge and suction ports, and which circuit includes a spring loaded by-pass valve 32. When the delivery nozzle 18 is closed, and if the pump is then delivering liquid, the valve 32 opens under the discharge pressure, thus permitting recirculation of the liquid without injuring the pump.

The pump P is also provided, in this invention, with another by-pass circuit 33 containing a valve 34, herein illustrated as being of the butterfly type. The position of the valve 34, and hence the operation of the circuit 33, is controlled by the liquid level, or air volume condition, in the separator S. To this end, the main chamber of the separator S contains a float 35 which is connected to the valve 34 by a mechanical linkage system 36, 37, 38, 39.

When the float 35 is raised, as it will be under conditions of normal operation, because of the liquid in the separator S, the linkage moves the valve 34 to closed position, and the liquid delivered by the pump must therefore either flow to the nozzle 18, or through the by-pass circuit 31. On the other hand, if the separator is overloaded with air, then the float 35 drops to open the valve 34, thus establishing the by-pass circuit 33, and preventing the further discharge of liquid through the nozzle 18, or the induction of liquid from the tank T. Under conditions leading to the opening of either by-pass circuit, there is, of course, no flow of liquid through the meter M.

As soon as the auxiliary pump 20 removes the excess gas volume from the separator S, more liquid flows from the tank T, the float 35 is raised, and the system is thereupon reconditioned for normal operation.

The system just described is illustrated more repletely in Fig. 2, with respect to the construction and arrangement of the pump and separator units. Insofar as they are applicable, the same reference numerals will be adopted to facilitate comparison of the two figures. This figure also shows how the units may be brought into compact relationship, in order to obtain the space economy required by the casings commonly employed in gasoline dispensers.

The general circuits are, of course, the same as have just been described. Thus, the main liquid path from the tank to the delivery point is taken through the suction conduit 11, separator S, lines 12 and 13 which lead to and away from the meter M, main pump P, and discharge line 16, 17, and 18. The auxiliary pump 20, which is now shown as being disposed in the same casing as the liquid pump P, has its suction side connected to the separator S, and its discharge line 21 entering the condensing chamber 22, now mounted on top of the separator. The pumping and separating portions are moreover brought into juxtaposition to facilitate the arrangements of the by-pass circuits.

Referring first specifically to the pumps shown in Fig. 2, it will be understood that each is provided with a rotor or other pumping element, 41 and 42 respectively, which are mounted on a common shaft 43 extending beyond the outer housing wall of the pump 20. The end of the shaft 43 is provided with a pulley 44 adapted to receive a driving belt 45 extending to a motor (not shown), to provide power to drive the pumps. The body or casing of the main pump P is provided with inlet and outlet passages, 46 and 47 respectively, for connection to the inlet and outlet lines 13 and 16, and these passages may communicate through another passage 48 formed in the body, and which passage 48 is provided with a valve seat 49. The passage 48 constitutes a partial consolidation of the previously described by-pass circuits 31 and 33.

The separator of Fig. 2, which has been generally designated by the reference letter S, comprises a casting formed with high and low level liquid inlet and outlet ports for connection to the lines 11 and 12, and with an internal baffle wall 51 provided with an orifice 52 at its lower portion. This wall, in effect, divides the casting into a receiving chamber 53 and a float chamber 54. Mixed liquid and gas entering the casting falls initially into the chamber 53, and the resulting agitation causes the air to rise to the top. The liquid body in the chamber 54 is relatively quiescent, as is desired to avoid too violent movement of the float 35 which is disposed therein.

The base of the previously described condensing chamber 22 forms a cover for the separator casting, and it contains a suction port 56 communicating with the vapor space above the chambers 53 and 54. The port 56 is connected, through a suitable fitting, to a line 57 extending to the suction side of the auxiliary pump 20. Gases which separate from liquid entering the separator S may therefore be withdrawn by the pump 20 for discharge, through the line 21, into the condenser 22. Inasmuch as a condition may arise wherein the port 56 is closed, the lines 57 and 21 are interconnected through a spring-loaded check valve 58, which opens toward the suction line 57 when the condition arises, and thereby provides a simple by-pass. Liquid condensing in the chamber 22 drains back to the chamber 52 through the connecting passage 24.

It will be noted that the main casting for the separator S is formed with an offset wall 61 which is adapted to align with the seat opening 49 formed in the adjacent wall of the casing of the main pump P. The lower portion of the wall 61, and the wall of the main pump P adjacent the discharge port 47, are both tapped to receive suitable fittings, to provide the previously described overload by-pass circuit 31, the check valve 32 being connected in this circuit. Liquid flowing through these fittings returns to the suction port 46 through the passage 48, and thus circulates around, rather than through, the valve seat 49.

The fluid passage extending between the port 47 and passage 48, through the valve seat 49, is adapted to be closed by the butterfly valve 34, the position of which is determined by the float 35. The float 35 is formed with upper and lower vertical stems 66 and 67, the upper stem having a valve tip adapted to close the port 56, and extending through a guide bracket 68 mounted in the chamber 54. When in its upper position, as will occur when the chamber 54 is flooded, the float serves to close the inlet line to the auxiliary pump 20, thus setting up the condition for by-passing operation through the check valve 58.

The lower stem 67 of the float 35 is connected, through a clevis connection 69, to one end of a lever 71, the opposite end of which is secured to a rotatable shaft 72 mounted in a bearing block 73 disposed within the chamber 54. The shaft extends through the wall of the casting S, leakage, of course, being prevented by any suitable packing gland. The free end of the shaft 72 has secured thereto a lever 75, the other end of which is pivoted to a link 76. The pivot for the valve 34 also extends through the wall of the pump P, to receive a lever 77, whose free end is connected to the link 76. Thus, as the float 35 drops, the lever 75 is depressed to rotate the lever 77 and thereby open the valve 34, while the raising of the float 35 causes the valve to close against its seat 49.

Let it be assumed that the chamber 54 contains very little liquid, as will occur when an excessive quantity of air is introduced into the separator. It is desirable, upon the occurrence of any such condition, to interrupt the operation of the system as one capable of pumping and measuring liquid, since any air which enters the line 12 will impose a false reading on the counter 15. Under this condition, the float 35 drops to open the valve 34, in the manner just described, to establish the by-pass circuit from discharge passage 47 to inlet passage 46, via valve seat 49 and passage 48. This action will take place whether the nozzle 18 is opened or closed, and therefore will occur irrespective of the pressure drop across the overload by-pass valve 31.

Concurrently with this action, the auxiliary pump 20 commences its duty of evacuating the air from the separator S. As the removal of the air progresses, an increasing percentage of the chambers 53 and 54 will be occupied with liquid, thus raising the float 35 until the valve 34 is again closed, and the suction line 57 for the pump 20 is blocked by the valved float stem 66.

The overload by-pass valve 31 may open whenever the pressure on the discharge side of the pump P becomes excessive, which is, of course, the intended condition for an ordinary by-pass valve.

It will be observed that the described invention involves a number of unusual features. First, the meter is disposed on the suction side of the pump. Heretofore, this has been considered a practical impossibility, because it is necessary to eliminate air from the liquid which passes the meter. It will be apparent that the proposal is, however, entirely practical, as has been described in this specification, and that thereby the high head pressure of the pump cannot possibly affect the meter operation. Second, it has heretofore been the prevailing practice to place the separator on the discharge side of the pump. The present invention departs from such practice, and moreover modifies standard separator practice in such way as to make an overloaded separator condition an automatic means for interrupting the flow of liquid to both the pump and meter.

It is also to be noted that a substantial number of the units of the apparatus are disposed on the suction side of the main pump, and therefore the portion of the dispenser under a positive pressure is confined to the discharge line and sight glass and associated fittings. Such arrangement introduces two desirable safety factors. In the event of any leak in the meter or separator or connecting lines, air is aspirated into the system, thus preventing the loss of gasoline and its attendant fire hazard. Moreover, such injection of air immediately tends to interrupt normal operation, thus inviting the attention of the operator to a defective condition, which might otherwise pass unnoticed.

It will, of course, be readily apparent to those skilled in the art that the specific means and arrangements of parts are susceptible of numerous modifications and variations, and that the invention is applicable to the pumping or dispensing of other liquids than gasoline. The foregoing description is therefore intended to be illustrative, and it is also intended that the invention should embrace all embodiments of its principles as are within the scope of the following claims.

I claim:

1. Dispensing apparatus for liquids such as gasoline which contain adventitious quantities of air comprising, a source from which the gasoline is withdrawn for delivery, a liquid pump having a discharge line, an air separator disposed in series with the suction side of the pump and said source, a by-pass circuit for the pump, and means responsive to the introduction of excessive gas volumes into the separator for opening said by-pass circuit and thereby interrupting the operation of the pump.

2. Dispensing apparatus for liquids such as gasoline comprising a source for the gasoline, a separator, a suction line connecting the separator to the source, a meter connected to the discharge side of the separator, and a pump connected to the discharge side of the meter, a float in the separator adapted to rise and fall with variations in the liquid volume therein, a by-pass circuit for the pump disposed between the inlet and outlet ports thereof, a valve in said by-pass circuit, and means responsive to the movement of the float for controlling the opening and closing of the valve.

3. In a dispensing apparatus having a liquid pump for withdrawing liquid from a supply source, a suction line for the pump, an air separator disposed in the suction line, an air vent port in the separator, an auxiliary pump having an inlet connected to the vent, a condensing chamber connected to the discharge side of the auxiliary pump, a return line from the condensing chamber to the suction line, a by-pass for the liquid pump, a valve for controlling the by-pass, a float in the separator, and means extending between the float and the valve to operate the valve in response to movements thereof induced by changes in the relative volumes of liquid and air in the separator.

4. Liquid dispensing apparatus comprising an air separator having a liquid inlet, a liquid outlet, and an air vent, a source of liquid to be dispensed connected to the liquid inlet, a liquid pump adapted to receive liquid from the separator for delivery to a discharge line, means in the discharge line to interrupt the flow of liquid therethrough, means for by-passing liquid around the pump, and means responsive to the amount of liquid in the separator and to the condition of the interrupting means in the discharge line for operating the by-passing means.

5. Liquid dispensing and measuring apparatus comprising a source of liquid supply communicating with a flow meter and thence with the inlet side of a liquid pump, a by-pass connection between the discharge and suction sides of the pump, a valve for closing said connection, a receptacle into which the liquid to be dispensed is discharged, a float in said receptacle, and means operative upon the lowering of the float to open the valve in the by-pass connection and thereby prevent the flow of liquid through said meter.

6. In a liquid dispensing system wherein a pump withdraws liquid from a source of supply, a pump provided with a by-pass circuit, a separator adapted to receive the liquid and gas admixed therewith, a float in the separator, a butterfly valve in the by-pass circuit, and means connecting the float and valve to open the valve and circuit when the float drops under conditions of limited liquid volume and excessive gas volume in the separator.

7. A liquid dispensing apparatus comprising a source for the liquid to be discharged, a separator, a flow meter, a liquid pump, and a manually operable discharge nozzle, piping connections for connecting said elements in series in the order named whereby the liquid flows successively to and through said elements, an air exhausting means connected to the separator and a condensing chamber connected to said exhausting means to receive the discharge thereof, said condensing chamber being connected both to the atmosphere and to the inlet side of said separator to provide a shunt circuit for the elimination of air and the reclaiming of condensate, a float in the separator, a by-pass circuit around the pump, said by-pass circuit including a valve, means responsive to the movement of said float for operating said valve, and means responsive to the manual operation of the discharge nozzle while said pump is operating for by-passing liquid around said pump irrespective of the position of said float.

8. In a liquid delivery apparatus, a pump having a suction side connected to a source of supply and a discharge side connected to a delivery line, a valve in the discharge line adapted to be opened and closed during the operation of the pump, an air separator receiving the liquid to be dispensed, said separator having an exhaust vent for air and a float adapted to rise and fall with changes in the relative volume of the liquid and air separator, a liquid by-pass circuit around the pump, valve means for the by-pass circuit, and means responsive to either the opening or closing of the valve in the discharge line or the movement of the float for controlling flow through the by-pass circuit past said by-pass valve means.

9. In apparatus for dispensing and measuring air-free liquid, a source of liquid to be dispensed, a delivery line, a pump for withdrawing the liquid from said source for transmittal to the delivery line, a hydraulic connecting line extending from said source to the inlet of the pump, an air separator and a flow meter disposed in series in said hydraulic connecting line between the source and the inlet of the pump, a float in the separator, said float being movably responsive to the liquid level in the separator, and means controlled by said float for stopping flow of liquid into the delivery line and thereby preventing the flow of liquid through the meter.

PORTER S. MORGAN.